(12) United States Patent
Wagoner et al.

(10) Patent No.: US 8,058,745 B2
(45) Date of Patent: Nov. 15, 2011

(54) SYSTEMS AND METHODS PROVIDING A POWER CONVERTER

(75) Inventors: Robert Gregory Wagoner, Roanoke, VA (US); Allen Ritter, Roanoke, VA (US); Aaron Lee Barr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 339 days.

(21) Appl. No.: 12/336,100

(22) Filed: Dec. 16, 2008

(65) Prior Publication Data

US 2010/0148578 A1 Jun. 17, 2010

(51) Int. Cl.
*H02J 3/00* (2006.01)
(52) U.S. Cl. ........................................................ 307/17
(58) Field of Classification Search .................... 307/17, 307/45, 82
See application file for complete search history.

(56) References Cited

U.S. PATENT DOCUMENTS

| | | | |
|---|---|---|---|
| 5,483,436 A | 1/1996 | Brown | |
| 7,071,579 B2 * | 7/2006 | Erdman et al. | 290/55 |
| 7,405,496 B2 | 7/2008 | Wagoner | |
| 7,446,435 B2 | 11/2008 | Zhang | |
| 2006/0126242 A1 | 6/2006 | Datta | |
| 2008/0219033 A1 | 9/2008 | Nishikawa | |
| 2008/0238520 A1 | 10/2008 | de Rooij | |
| 2008/0272658 A1 | 11/2008 | Kojori | |

* cited by examiner

*Primary Examiner* — Jared Fureman
*Assistant Examiner* — Carlos Amaya
(74) *Attorney, Agent, or Firm* — Sutherland Asbill & Brennan LLP

(57) ABSTRACT

Embodiments of systems and methods for providing power to one or more loads are provided. According to one embodiment, there is disclosed a power supply system for providing power to one or more loads. The power supply system may include at least one inverter having inverter input terminals and inverter output terminals, wherein the inverter input terminals may be electrically connectable to a source power supply. The power supply system may also include at least one isolation transformer having isolation transformer input terminals and isolation transformer output terminals, wherein the isolation transformer input terminals may be in electrical communication with the inverter output terminals of one or more inverters. The power supply system may additionally include at least one load having load input terminals, wherein the load input terminals may be in electrical communication with the isolation transformer output terminals of the one or more isolation transformers.

18 Claims, 3 Drawing Sheets

FIG 1 – PRIOR ART

SYSTEMS AND METHODS PROVIDING A POWER CONVERTER

FIELD OF THE INVENTION

This invention relates generally to power converters, and more specifically to systems and methods providing a power converter.

BACKGROUND OF THE INVENTION

Many devices, such as wind turbines or other turbine generators, may include power converter systems, such as to drive switching devices. Switching devices may be utilized to deliver power at a fixed frequency, for instance, such as to a power grid, or when driving high speed electric machines or high speed, high power electric motors. In some instances, high speed, high power electric motors may be utilized in industrial applications to power pumps, fans, blowers, or compressors. In addition, high speed, high power electric motors that operate at variable speed are increasingly required in a range of industrial, mining, and drilling activities. Further, the activities often require a relatively high degree of reliability. In operations such as crude oil pumping from remote global locations where access to pumping stations is difficult and time consuming, reliability of motor operation is necessary to prevent dangerous, costly, and extended outages.

A relatively high speed, high power electric motor may receive power from a source power supply. In many applications, the power signal that is output from the source power supply may be passed through a power converter prior to being input into the high speed, high power electric motor. A power converter system may be used to convert an input current or voltage, which may be a fixed frequency alternating current, a variable frequency alternating current, or a direct current, to an output current at adesired output frequency and voltage level. A converter system can include several power semiconductor switches such, as insulated gate bipolar transistors ("IGBT"), integrated gate commutated thyristors ("IGCT" or "GCT"), metal oxide semiconductor controlled thyristors ("MCT"), triacs, power transistors, field effect transistors ("FET"), or metal oxide semiconductor field effect transistors ("MOSFET") that are switched at certain frequencies to generate the desired converter output voltage and frequency. Example semiconductor switches as described can be utilized to provide switched current paths to deliver power from the input, or power source, which may be at one frequency and voltage, to the output or load, which may require a different frequency and/or voltage. The input power may be converted to a high frequency alternating current prior to delivery to the semiconductor switches.

Relatively simple, sturdy, and reliable power converters are requisites for such high speed, high power motor operations. Converters, including multiple, individual components, may have an increased likelihood that any one individual component switch may randomly fail, driving down system reliability. Adding elements to the converters, such as snubber circuits for semiconductor switches, further increases the number of components that may fail. Moreover, in many existing solutions, multiple power converters are combined in parallel to drive the load or loads. Each power converter may drive one or multiple semiconductor switches and other peripheral components. When multiple power converters are combined as a single system, current solutions have a large number of individual components, driving down the reliability and increasing system costs.

Accordingly, there exists a need for improved power supply systems. There exists a further need for power supply systems that reduce the number of components, increasing reliability and reducing costs thereof.

BRIEF DESCRIPTION OF THE INVENTION

According to one embodiment of the invention, there is disclosed a power supply system for providing power to one or more loads. The power supply system may include at least one inverter having inverter input terminals and inverter output terminals, wherein the inverter input terminals may be electrically connectable to a source power supply. The power supply system may also include at least one isolation transformer having isolation transformer input terminals and isolation transformer output terminals, wherein the isolation transformer input terminals may be in electrical communication with the inverter output terminals of one or more inverters. The power supply system may additionally include at least one load having load input terminals, wherein the load input terminals may be in electrical communication with the isolation transformer output terminals of the one or more isolation transformers.

According to another embodiment of the invention, there is disclosed a power supply system for providing power to at least one load. The power supply system may include multiple converter cabinets, each converter cabinet having at least one isolation transformer having isolation transformer input terminals and isolation transformer output terminals. The power supply system may also include at least one inverter having inverter input terminals and inverter output terminals. The inverter input terminals may be electrically connectable to a source power supply, the inverter output terminals may be in parallel electrical communication with the isolation transformer input terminals of each of the one or more isolation transformers in each of the multiple converter cabinets, and the isolation transformer output terminals of each of the one or more isolation transformers in each of the multiple converter cabinets may be electrically connectable to at least one load.

According to yet another embodiment, there is disclosed a method for providing power to one or more loads. The method may include providing a source voltage to at least one inverter. The method may further include electrically coupling inverter output terminals of the one or more inverters to at least one isolation transformer, enabling high frequency alternating current to be delivered from the one or more inverters to the one or more isolation transformers, and electrically coupling isolation transformer terminals of the one or more isolation transformers to at least one load, enabling alternating current to be delivered from the one or more isolation transformers to the one or more loads.

Other embodiments, aspects, and features of the invention will become apparent to those skilled in the art from the following detailed description, the accompanying drawings, and the appended claims.

BRIEF DESCRIPTION OF THE DRAWINGS

Figure 1:
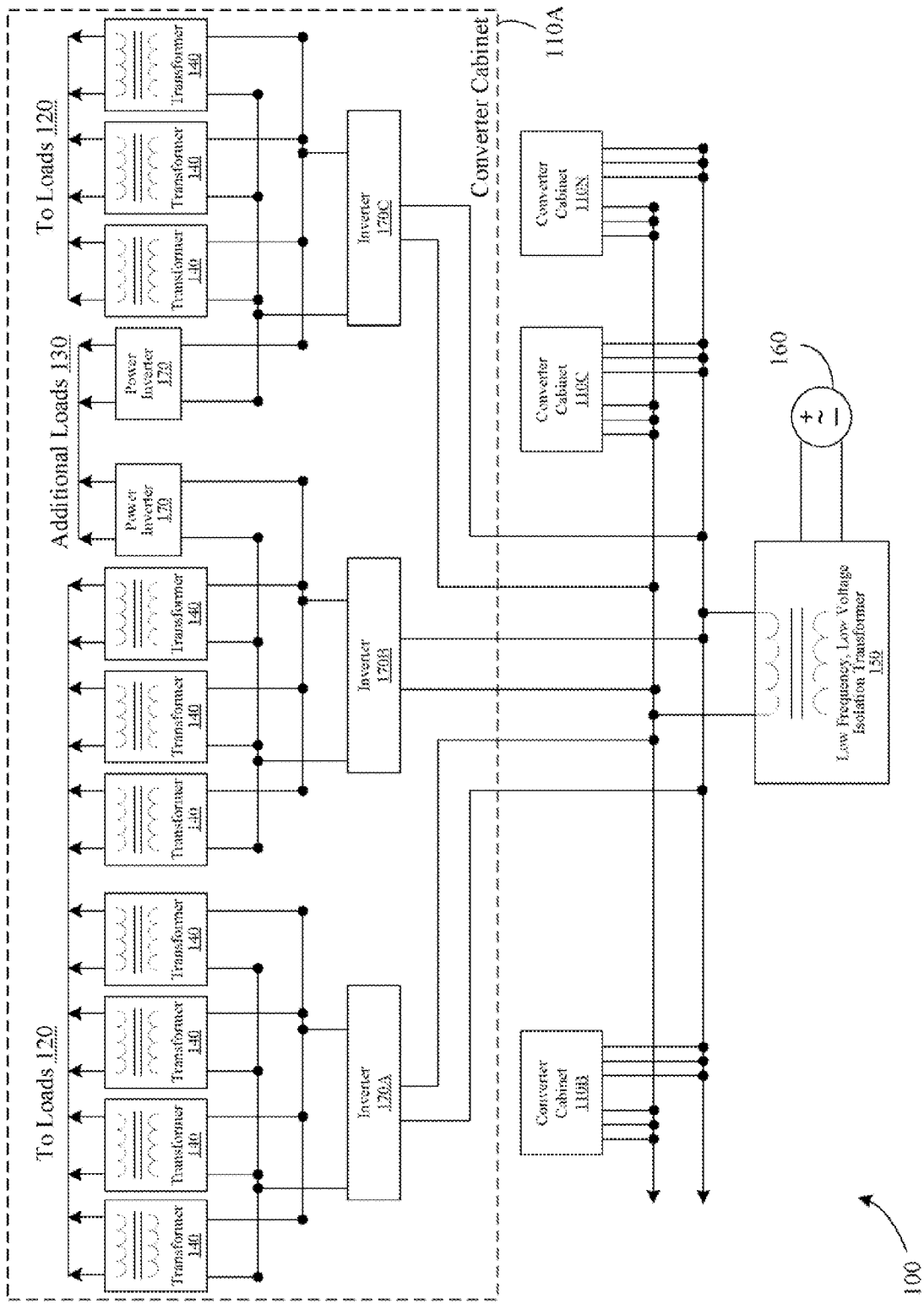

Having thus described the invention in general terms, reference will now be made to the accompanying drawings, which are not necessarily drawn to scale, and wherein:

FIG. 1 is a schematic representation of an example conventional power supply system.

Figure 2:
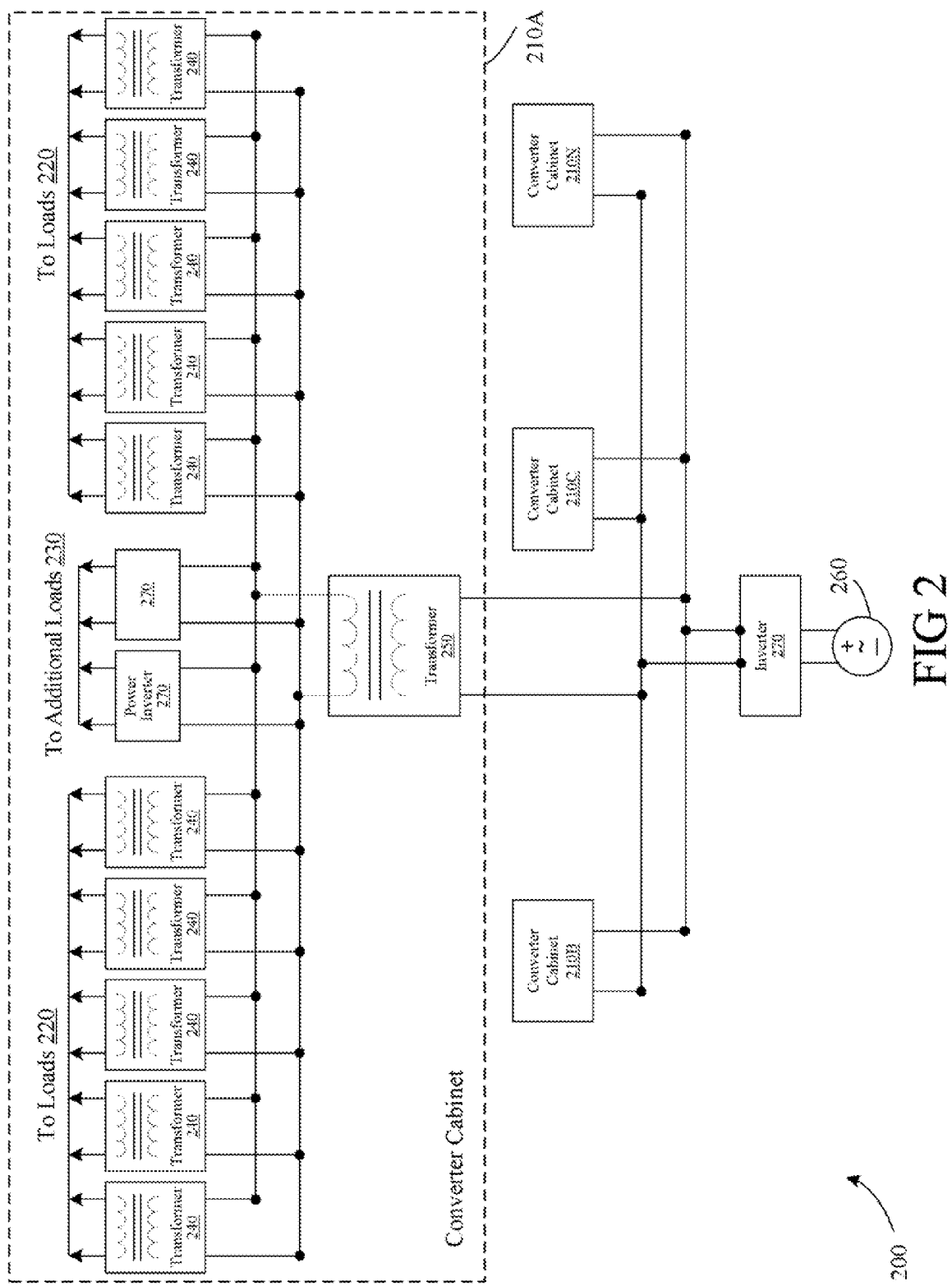

FIG. 2 is a schematic representation of an example power supply system, in accordance with one embodiment of the invention.

Figure 3:
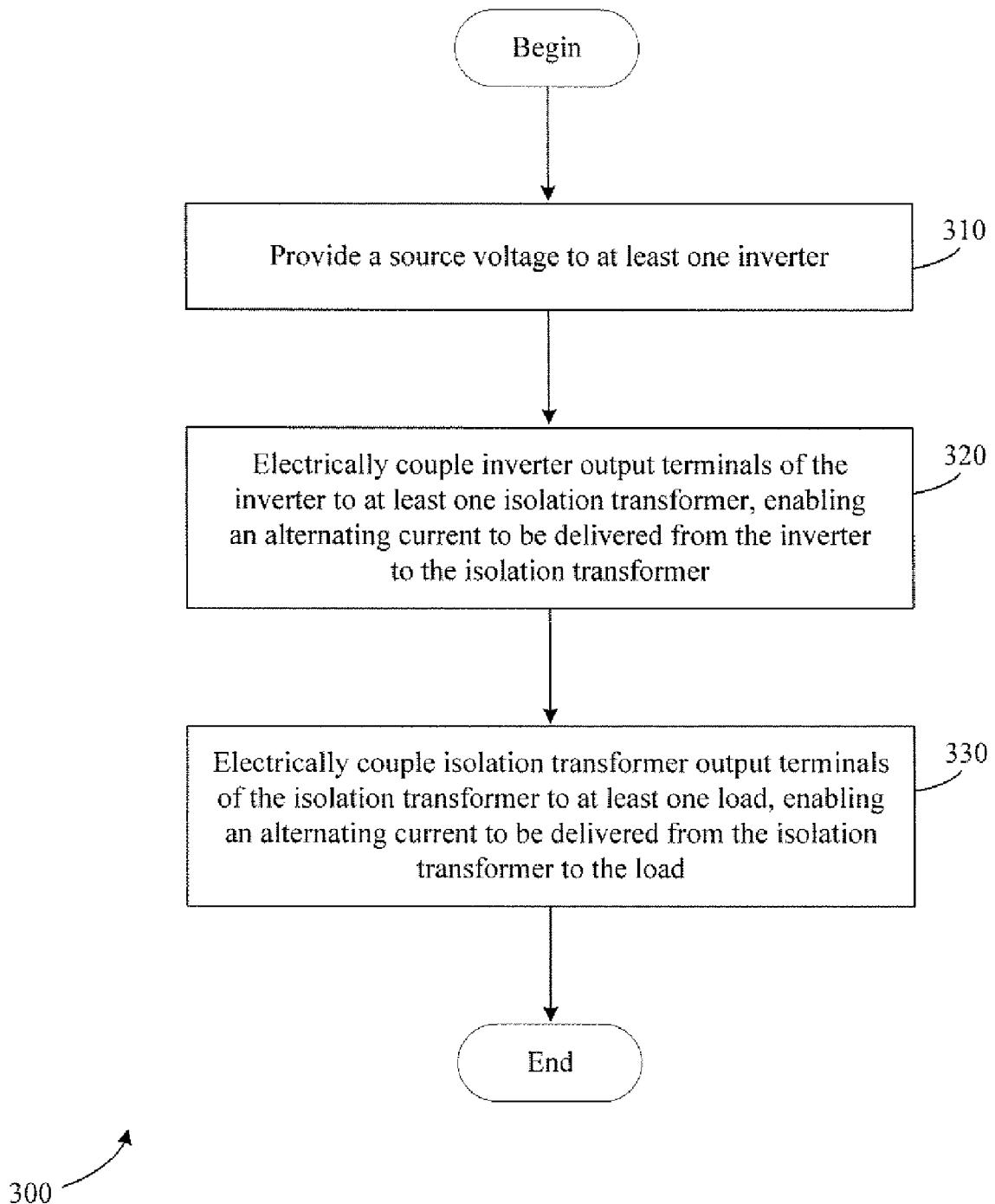

FIG. 3 is a flowchart illustrating one example method for providing power to one or more loads, in accordance with one embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for providing power to one or more loads. According to one embodiment of the invention, a power supply system may be used to convert a source power prior to providing power to a load or loads, such as switches, power inverters, motors, power grids, and the like. For example, a source power supply may provide a relatively low frequency alternating current. The low frequency alternating current may be delivered to one or more inverters which may convert the low frequency alternating current to a relatively high frequency alternating current. The conversion of low frequency alternating current to high frequency alternating current can reduce the size and cost of system components, for example, capacitors, inductors, and transformers. The high frequency alternating current may then be delivered to one or more power converter cabinets, which may include additional electrical circuitry therein. According to an example embodiment, each power converter cabinet may be used to drive one or more loads, (e.g., semiconductor switching devices, inverters etc.), which may further be operable to drive one or more loads (e.g., motor, power grid, etc.). In one example embodiment, the high frequency alternating current may be delivered to the load or loads via individual transformers in electrical connection to the loads (or, in some embodiments, integrated with the loads). Though, according to another example embodiment, the high frequency alternating current may be used to directly drive one or more loads. The power converter cabinet circuitry may further include one or more isolation transformers for receiving the high frequency alternating current from the inverter and delivering a high frequency alternating current to one or more loads. Thus, as compared to example conventional switching power supply systems, as described in more detail below, certain embodiments of the system can increase system reliability and can reduce cost by reducing the number of inverters, thus reducing the number of electrically and relatively complex and costly components.

The power converter cabinets and respective power supply circuitry may be operable for delivering power to any load, such as for driving switching devices, for example, for delivering a fixed frequency power to other loads (e.g., a power grid, an electric machine, an electric motor, etc.), for delivering a variable frequency power to a load (e.g., variable speed induction motors, etc.), and/or for delivering direct current power to a load (e.g., heaters, direct current motors, battery chargers, etc.).

FIG. 1 illustrates a schematic of one example conventional power supply system 100. The power supply system 100 illustrated represents a system of multiple power converters 110A-110N connected in parallel, each power converter 110 including switch power converter circuitry. The power converter circuitry is designed to drive multiple loads 120. Example loads 120 may include, but are not limited to, semiconductor switches, such as IGCTs or GCTs, IGBTs, FETS, MOSFETS, or any other switching device to be connected to the high frequency side of the power supply. FIG. 1 illustrates one or more additional loads 130 electrically connected to the power supply circuitry. Example additional loads 130 other than switches, may include, but are not limited to, one or more monitor circuits, such as may be used to monitor the power converter output levels, or one or more power inverters, such as alternating current to direct current power inverters. In the conventional power converter cabinet 110 illustrated in FIG. 1, each of the loads 120 are illustrated as including a transformer 140 in electrical communication between the loads 120 and the power supply circuitry.

This conventional power supply system 100 includes a relatively low frequency isolation transformer 150 electrically connected between a source power supply 160 and the inputs to multiple inverters 170, such as relatively high frequency inverters, for converting low frequency input alternating current, such as an alternating current with a 60 Hz frequency, to a relatively high frequency output alternating current, such as an alternating current having a frequency greater than 600 Hz. The high frequency output alternating current is used for delivering power to the multiple loads 120, such as switches, via transformers 140. In this example, three inverters 170A-170C are provided for each power converter 110A-110N; however any number of inverters 170 may be provided in similar conventional solutions. Multiple inverters 170 are provided because each may have an upper power limit, and only be capable of driving a select number of loads.

Thus, in a system 100 having multiple power converter cabinets 110A-110N connected in parallel, and requiring multiple inverters 170 per converter, a relatively large number of inverters 170 may be used. For example, in a system having sixteen total power converters 110 connected in parallel, and three inverters 170 per power converter, a total of at least forty eight inverters 170 can be used. Inverters 170 used in the conventional solution are relatively high frequency inverters, each including many electronic components, such as multiple diodes, capacitor banks, and semiconductor switches. Accordingly, the reliability of the system 100 decreases substantially with an increase in the number of inverters 170. In addition, such a larger number of inverters 170 also accounts for significant costs in constructing the system 100.

The isolation transformer 150 included in the conventional system 100 is a relatively low frequency transformer, for coupling to a low frequency source power supply 160. Such low frequency transformers 150 are also quite costly and relatively large in size, requiring an unnecessarily large physical footprint and significant costs in the conventional power supply system 100.

FIG. 2 illustrates an example schematic of an improved power supply system 200, according to one embodiment of the invention. The improved power supply system 200 reduces the number of inverters and eliminates or otherwise minimizes the need for the relatively large low frequency transformer, replacing it with a high frequency isolation transformer in each converter, for example.

In the example improved power supply system 200 illustrated in FIG. 2, a single inverter 270 can be electrically connected between a source power supply 260 and one or more power converter cabinets 210A-210N housing switch power converter circuitry. In one embodiment, the inverter 270 may be a relatively high frequency inverter, and may be constructed as to be operable to rectify a low frequency alternating current to a direct current and convert the direct current to a high frequency alternating current. For example, the inverter 270 may receive from the source power supply 260, low frequency alternating current at the inverter input terminals, and convert the low frequency alternating current to a direct current via rectifying circuitry. The direct current may then be converted to high frequency via alternating current inverter circuitry, and the resulting high frequency alternating current may be delivered to the circuitry in each of a plurality of converter cabinets 210A-210N. In example embodiments, the inverter 270 may also be constructed to convert relatively low input voltages to high output voltages, or relatively high input voltages to low input voltages, such as by include step-up or step-down circuitry. This description of the inverter 270 circuitry is intended to be exemplary only, and any other inverter circuitry may be included for delivering a high frequency alternating current to the power converter cabinets 210A-210N.

According to one example embodiment, the inverter 270 may be configured to receive input alternating current having a frequency between approximately 50 Hz and approximately 60 Hz and having a voltage between approximately 115 V and approximately 460 V. An example inverter 270 may be further configured to generate a high frequency output alternating current having a frequency between approximately 1,000 Hz and approximately 25,000 Hz, and having a voltage between approximately 20 V and approximately 100 V. In one example embodiment, the output power from an example inverter 270 may be between approximately 100 W and approximately 5,000 W. In other embodiments, however, an example inverter 270 may transform input alternating current having a frequency that may range between approximately 20 Hz and approximately 1000 Hz and having a voltage between approximately 10 V and approximately 2000 V, and creating between approximately 10 W and approximately 10,000 W output power. In addition, in other embodiments, the example inverter may deliver high frequency output alternating current having a frequency that may range between approximately 20 Hz and approximately 25,000 Hz and having a voltage between approximately 10 V and approximately 2000 V, generating between approximately 10 W and approximately 10,000 W output power. The design of the inverter may depend upon the overall design of the system and its intended applications, such as the source power supply and/or the intended load or loads to be driven by the switches or any other peripheral loads. For example, in one embodiment in which the power supply system 200 is configured to power one or more IGCT switching devices, such as may be used for switching one or more H-bridge circuits, the inverter 270 can be configured to receive input alternating current having a frequency between 50 Hz and 60 Hz and having a voltage between approximately 110 V and approximately 120 V. The output power of the inverter 270 is approximately 500 W at approximately 1 KHz and approximately 20 V.

In other example embodiments, the power supply system 200 may include multiple inverters 270 electrically connected in parallel between one or more source power supplies 260 and one or more isolation transformers 250 of one or more of the power converter cabinets 210A-210N.

In yet other example embodiments, the power supply system 200 may include inverters 270 having different circuitry. For example, in one embodiment, an inverter 270 may be electrically connectable to a direct current source power supply and configured to convert a direct current to an alternating current. Accordingly, as used herein, the term "inverter" may generally refer to any circuitry configured to alter the current input from a source power supply, including, but not limited to, inverting a direct current to an alternating current or converting a relatively low frequency alternating current to a relatively high frequency alternating current.

Still with reference to FIG. 2, each converter cabinet 210A-210N may include at least one isolation transformer 250 electrically connected between the one or more inverters 270 and one or more loads 220 or additional loads 230. In the example switching power supply system 200 illustrated in FIG. 2, each isolation transformer 250 can be in electrical communication with multiple load transformers 240, which may be configured to deliver power to one or more switching devices, gate drives, additional inverters, or other loads 220 on the output side. In one example embodiment, the loads 220 may be one or more switching devices, such as an IGCT switching device which includes gate drive circuitry for providing switching signals to the switching circuitry, and may be driven by one or more gate drive transformers 240. Though, in other embodiments, the loads 220 may be any other switching device, as described herein. The example embodiment illustrated in FIG. 2 also illustrates additional loads 230 electrically connected to the output side of the isolation transformer 250. These additional loads 230 may include, but are not limited to, the example additional loads 130 as described with reference to FIG. 1 above, such as an alternating current to direct current power inverter, which may be used to provide direct current power to other peripheral components of the power supply system.

The isolation transformer 250 can serve to isolate potential differences between the input and output terminals of the transformer, and to minimize ground loop currents when the neutral or ground potential differs from the input to the output side of the isolation transformer. The isolation transformer 250 may also electrically isolate components connected to its input terminals (e.g., power converter cabinets 210A-210N, the inverter 270, and/or the source power supply 260) from the components (or loads) connected to the output terminals. Accordingly, the isolation transformer 250 may be rated to provide an isolation voltage, an isolation current, and/or a power rating commensurate with the potential electrical exposure that may occur in the event of a failure of one or more of the loads 220 or additional loads 230, or of the load transformers 240.

According to one example embodiment, the isolation transformer 250 may be rated to an isolation voltage upper limit of approximately 15,000 V, and in one example ranging between approximately 2000 V and approximately 10,000 V, and to a power limit of approximately 5000 W, and in one example ranging between approximately 100 W and approximately 5000 W.

According to one example embodiment, the isolation transformer 250 may be configured to accept an input signal similar to that delivered by the inverter 270 to which it is coupled, such as input alternating current having a frequency between approximately 1,000 Hz and approximately 25,000 Hz and having a voltage between approximately 20 V and approximately 100 V, generating approximately 100 W to approximately 5000 W of output power. In other embodiments, however, the input alternating current delivered to the isolation transformer 250 may have a frequency ranging between approximately 20 Hz and approximately 2,000 Hz and having a voltage between approximately 10 V and approximately 2000 V, generating approximately 10 W to approximately 10,000 W of output power.

Similarly, according to one embodiment, the output of the isolation transformer 250 may be configured to deliver the desired output to drive the corresponding loads 220 or additional loads 230, such as delivering an output alternating current having a frequency between approximately 600 Hz and approximately 25,000 Hz and having a voltage between approximately 5 V and approximately 100 V, and an output power of approximately 100 W to approximately 5,000 W. In other embodiments, however, the isolation transformer 250 may deliver high frequency output alternating current having a frequency that may range between approximately 400 Hz and approximately 25,000 Hz and having a voltage between approximately 10 V and approximately 1000 V, generating approximately 10 W to approximately 10,000 W of output power. The design of the isolation transformer 250 may depend upon the overall design of the system 200 and its intended applications, such as the source power supply and/or the intended loads to be driven. For example, the isolation transformer 250 may also include voltage step-up or voltage step-down circuitry, in one embodiment.

In other example embodiments, the power supply system 200 may include multiple isolation transformers 250 electrically connected in parallel between the inverter 270 and one or more loads 220 or additional loads 230 in one or more of the power converter cabinets 210A-210N.

FIG. 3 illustrates a flowchart illustrating one example method 300 for providing a power converter, in accordance with one embodiment of the invention.

The example method 300 begins at block 310. In block 310, a source voltage is provided to at least one inverter. In one example embodiment, the source voltage may be provided by a source power supply, such as a low frequency alternating current power supply. Though in other example embodiments, the source power supply may be any other type of power supply, such as those described in more detail with reference to FIGS. 1 and 2. The inverter may be a relatively high frequency inverter, or any other inverter, such as those described in more detail with reference to FIG. 2. In one example embodiment, providing a power supply to an inverter can allow a relatively low frequency input alternating current to be converted to a relatively high frequency output alternating current, as described herein. Delivering a high frequency alternating current to switch power converter circuitry, such as power converter circuitry provided in one or more power converter cabinets, allows delivering that current to one or more load devices at a high frequency, such as may be used to control switching devices, as described herein.

In one example embodiment, the power source providing the source voltage and the inverter may be physically located separately from one or more power converter cabinets, allowing the inverter to deliver a relatively high frequency alternating current to multiple power converter cabinets. In other embodiments, multiple inverters may be provided, and/or multiple power supplies may supply a source voltage to one or more inverters.

Following block 310 is block 320, in which the output terminals of the inverter or inverters are electrically coupled to at least one isolation transformer. The isolation transformer may be a relatively high frequency, high voltage isolation transformer, such as is described in more detail with reference to FIG. 2. The isolation transformer may be configured to receive a relatively high frequency alternating current from the inverter and deliver a corresponding current to one or more loads. The isolation transformer can serve to electrically isolate any loads or other circuitry or components electrically coupled to its output side from components electrically coupled to its input side, such as other power converter cabinets, inverters, and/or source power supplies.

In one embodiment, a single isolation transformer may be provided in each power converter cabinet, providing electrical isolation within each cabinet. In other embodiments, multiple isolation transformers may be provided in one or more power converter cabinets. For example, multiple isolation transformers may be in parallel electrical connection within a single power converter cabinet, electrically connected to the output of one or more inverters.

Following block 320 is block 330, in which the one or more isolation transformers in each converter cabinet may be electrically coupled to one or more loads. The one or more loads may be any load, such as a switching device, or any other load, as described in more detail with reference to FIGS. 1 and 2. Coupling the one or more isolation transformers to one or more loads allows a relatively high frequency alternating current, such as a current generated corresponding to the high frequency alternating current converted by the inverter in block 310, to a load. Moreover, as described above, the isolation transformer can serve to electrically isolate the loads from the rest of the power supply circuitry.

In example embodiments, one or more transformers may be electrically coupled between one or more loads and the isolation transformer, such as to provide additional electrical isolation, voltage step-up, voltage step-down, and the like.

The example method 300 may end following block 330, having provided an example power supply system that reduces the number of electrically and relatively complex, expensive, and/or large components, thereby increasing system reliability and decreasing costs.

Accordingly, example embodiments of the improved power supply, such as those described with reference to FIGS. 2 and 3, can provide fewer inverters by connecting one or more inverter to the input of the converter cabinet or cabinets, rather than having multiple inverters in each cabinet. According to these embodiments, the single (or substantially fewer) inverter still serves to convert a source current to a relatively high frequency alternating current, but avoids introducing extraneous hardware components (such as the multiple inverters per cabinet as illustrated in the example conventional system of FIG. 1) by placing one or more inverters independent from the converter cabinet or cabinets. Since inverters may include transformers, plus many additional components (i.e., capacitors, integrated circuits, power switching circuits, etc.), there may be advantageous cost savings if the number of inverters can be reduced, even if it an increase in the number of isolation transformers is needed. Thus, as a result of the fewer electrically and relatively complex inverters, example embodiments of the power supply system can have the technical effect of substantially increasing system reliability while reducing system costs.

Moreover, example embodiments of the improved power supply system can have an additional technical effect by creating additional system efficiencies, in terms of size and space, by providing a single isolation transformer, such as a high frequency, high voltage isolation transformer, in each cabinet, instead of the larger, more expensive, low frequency, low isolation transformer placed outside of the power converter cabinets as illustrated in the example conventional system of FIG. 1. Comparing the example embodiment of the improved power supply system illustrated in and described with reference to FIGS. 2 and 3 to the conventional system illustrated in FIG. 1, an isolation transformer may be positioned in each power converter cabinet in lieu of the multiple high frequency gate drive inverters of the conventional system. Because each isolation transformer in the improved power supply system is positioned between a relatively high frequency inverter and one or more loads, the isolation transformer can be a relatively high frequency isolation transformer, which are considerably cheaper than the low frequency transformers used in the conventional system, due to smaller size and thus lower materials cost, but still provide the desired isolation between the load or loads and the input side circuitry and components.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable persons to practice the invention, including making and using any devices or systems and performing any incorporated methods. The patentable scope the invention is defined in the claims, and may include other examples. Such other examples are intended to be within the scope of the claims if they have structural elements that do not differ from the literal language of the claims, or if they include equivalent structural elements with insubstantial differences from the literal languages of the claims.

The claimed invention is:

1. A power supply system for providing power to one or more loads, comprising:
    at least one inverter comprising inverter input terminals and inverter output terminals, wherein the inverter input terminals are electrically connectable to a source power supply;
    a plurality of isolation transformers, each of the plurality of isolation transformers comprising isolation transformer input terminals and isolation transformer output terminals, wherein each of the isolation transformer input terminals is in electrical communication with the inverter output terminals of the at least one inverter;
    at least one load comprising load input terminals, wherein the load input terminals are in electrical communication with the isolation transformer output terminals of the at least one isolation transformer; and
    wherein the plurality of isolation transformers are in parallel electrical communication with the at least one inverter, and wherein output terminals of each of the plurality of the isolation transformers are in parallel electrical communication with a plurality of load transformers.

2. The power supply system of claim 1, wherein the at least one inverter is configured to convert a low frequency alternating current to a high frequency alternating current.

3. The power supply system of claim 1, wherein the at least one inverter is configured to convert a direct current to a high frequency alternating current.

4. The power supply system of claim 1, wherein the at least one inverter is configured to output an alternating current having a frequency greater than approximately 400 Hz.

5. The power supply system of claim 1, wherein the at least one inverter is configured to output an alternating current having a frequency between approximately 20 Hz and approximately 25,000 Hz.

6. The power supply system of claim 1, wherein the at least one inverter is configured to receive an alternating current from the source power supply having a frequency between approximately 50 Hz to approximately 60 Hz and having a voltage between approximately 12 V to approximately 600 V at the inverter input terminals, and configured to convert the alternating current to an output alternating current having a frequency between approximately 10,000 Hz to approximately 25,000 Hz and having a voltage between approximately 10 V to approximately 100 V.

7. The power supply system of claim 1, wherein the at least one isolation transformer is configured to isolate voltages up to 15,000 V from at least one of the at least one inverter or the source power supply.

8. The power supply system of claim 1, wherein the at least one load further comprises a load transformer electrically connectable between the at least one isolation transformer and the at least one load.

9. The power supply system of claim 1, wherein the at least one load comprises at least one switching device.

10. The power supply system of claim 1, wherein the at least one load comprises a gate drive operable to control at least one switching device.

11. The power supply system of claim 1, wherein the at least one load comprises at least one power converter.

12. A power supply system for providing power to at least one load, comprising:
    a plurality of converter cabinets, each converter cabinet comprising at least one isolation transformer comprising isolation transformer input terminals and isolation transformer output terminals;
    at least one inverter comprising inverter input terminals and inverter output terminals;
    wherein the inverter input terminals are electrically connectable to a source power supply;
    wherein the inverter output terminals are in parallel electrical communication with the isolation transformer input terminals of each of the at least one isolation transformers in each of the plurality of converter cabinets;
    wherein the isolation transformer output terminals of each of the at least one isolation transformers in each of the plurality of converter cabinets are electrically connectable to at least one load; and
    wherein each of the at least one isolation transformers is in parallel electrical communication with the at least one inverter, and wherein output terminals of each of the isolation transformers are in parallel electrical communication with a plurality of load transformers.

13. The power supply system of claim 12, wherein the at least one inverter is configured to convert a low frequency alternating current to a high frequency alternating current.

14. The power supply system of claim 12, wherein the isolation transformer output terminals of each of the at least one isolation transformers in each of the plurality of converter cabinets are in electrical communication with a load transformer in electrical communication with at least one switching device.

15. A method for providing power to one or more loads, comprising:
    providing a source voltage to at least one inverter;
    electrically coupling inverter output terminals of the at least one inverter to at least one isolation transformer, enabling high frequency alternating current to be delivered from the at least one inverter to the at least one isolation transformer; and
    electrically coupling isolation transformer terminals of the at least one isolation transformer to at least one load, enabling the alternating current to be delivered from the at least one isolation transformer to the at least one load; and
    electrically coupling the at least one isolation transformer in parallel electrical communication with the at least one inverter, wherein output terminals of the at least one isolation transformer are in parallel electrical communication with a plurality of load transformers.

16. The method of claim 15, wherein electrically coupling the isolation transformer terminals of the at least one isolation transformer to the at least one load further comprises electrically coupling the isolation transformer terminals to at least one switching device.

17. The method of claim 15, wherein electrically coupling the isolation transformer terminals of the at least one isolation transformer to the at least one load further comprises electrically coupling the isolation transformer terminals to at least one load transformer electrically coupled to the at least one load.

18. The method of claim 15, wherein electrically coupling the isolation transformer terminals of the at least one isolation transformer to the at least one load further comprises electrically coupling the isolation transformer terminals to at least one power inverter.

* * * * *